(12) United States Patent
Monetti

(10) Patent No.: US 8,624,444 B2
(45) Date of Patent: Jan. 7, 2014

(54) ENERGY SAVING SWITCH FOR AND PROCESS FOR CONSERVING ENERGY WHILE OPERATING A WATER HEATER

(76) Inventor: Robert Monetti, Newbury Park, CA (US)

( * ) Notice: Subject to any disclaimer, the term of this patent is extended or adjusted under 35 U.S.C. 154(b) by 0 days.

(21) Appl. No.: 13/491,246

(22) Filed: Jun. 7, 2012

(65) Prior Publication Data

US 2013/0327843 A1    Dec. 12, 2013

(51) Int. Cl.
*H01H 51/34* (2006.01)
(52) U.S. Cl.
USPC ............... 307/154; 307/132 R; 122/14.22
(58) Field of Classification Search
USPC ..... 307/139, 140, 143, 132 R, 132 E, 132 M, 307/154; 122/14.2, 14.21, 14.22; 236/20 R
See application file for complete search history.

(56) References Cited

U.S. PATENT DOCUMENTS

| | | | |
|---|---|---|---|
| 1,993,926 A * | 3/1935 | Gauger | 137/624.11 |
| 2,266,244 A | 12/1941 | Osterheld | |
| 4,016,402 A * | 4/1977 | Scott | 392/464 |
| 4,166,944 A | 9/1979 | Scott | |
| 4,413,775 A * | 11/1983 | Scott | 236/20 R |
| 4,535,931 A | 8/1985 | Bartok et al. | |
| 4,549,160 A | 10/1985 | McGhee | |
| 4,692,051 A | 9/1987 | Stansbury, Jr. et al. | |
| 5,103,078 A | 4/1992 | Boykin et al. | |
| 5,816,491 A | 10/1998 | Berkeley et al. | |
| 6,375,087 B1 | 4/2002 | Day et al. | |
| 6,920,843 B1 | 7/2005 | Wilson | |
| 8,022,647 B1 | 9/2011 | Davis et al. | |
| 2007/0051819 A1 | 3/2007 | Isaacson | |
| 2011/0062248 A1 | 3/2011 | Subramanian | |

* cited by examiner

Primary Examiner — Fritz M Fleming
(74) Attorney, Agent, or Firm — Kelly & Kelley, LLP

(57) ABSTRACT

A process for conserving energy while operating a water heater includes the steps of programming a system controller with at least one time interval and assigning a target temperature, comparing the current time to the programmed time interval and the current water temperature setting for the water heater against the target temperature, and heating the water as long as the current time is within the time interval and the water temperature setting is less than the target temperature. An energy saving switch includes a programmable logic controller, geared control shafts, a motor, a control lever, and a mating cuff. Together, these members control the water heater thermostat control valve to ensure that hot water is available only during the times of day when it is required.

18 Claims, 8 Drawing Sheets

ENERGY SAVING SWITCH FOR AND PROCESS FOR CONSERVING ENERGY WHILE OPERATING A WATER HEATER

BACKGROUND OF THE INVENTION

Virtually all homes in the United States and other developed countries include a system for providing heated water. Traditional hot water systems include a tank for storing and heating water.

These systems often include a large tank encased in insulation and positioned with a heating element. The tank also includes an external thermostat control valve for manipulating the temperature of the water in the tank. The heating element heats the stored water in the tank to the temperature set on the thermostat control valve. Once the water is heated to the desired temperature, the heating element stops heating the water. If the water temperature falls below the desired temperature, the heating element turns on again to heat the water. This cycle continues indefinitely so that hot water is always available.

These traditional water heating systems fail to take into account the changing demand for hot water in a normal household on an hourly basis throughout the day. For example, in the morning more hot water is needed for showers, breakfast preparation and cleanup, and other household chores. In the mid-morning through the afternoon, the demand for hot water decreases as household members go to work and to school. Then later in the afternoon, hot water demand increases again for dinner preparation and cleanup, evening bathing, and more household chores. This means that in a 24 hour cycle, a normal household may only require hot water for only a fraction of that time.

Frugal homeowners quickly realize that keeping water heated during time periods when there is little demand for hot water is wasteful and expensive. Indeed, the U.S. Department of Energy estimates that water heating accounts for 14%-25% of energy consumption in a typical household. Homeowners with gas powered water heaters may attempt to combat the expense of keeping water heated all day by utilizing the thermostat control valve that is accessible on all gas powered water heaters. In an attempt to save money, a homeowner may turn down the temperature of his gas powered water heater during the time intervals when he knows that hot water will not be required. But this method of saving energy and money is problematic. The homeowner may forget to turn the water temperature back up after the water in the tank has been left to cool all day or night with no hot water available for morning showers and cleanup. Typical gas powered water heaters take 40 minutes to an hour to heat a tank of water. This means that the homeowner may be left without hot water when the demand once again arises. Additionally, when adjusting the temperature control dial on a water heater, a homeowner may turn the heat setting too high or too low. If the water temperature is too hot, there is a risk of scalding when extremely hot water is dispensed through the house's plumbing. If the water temperature is too low, the homeowner may not be able to effectively and comfortably bathe or do other household chores.

Several patents and patent applications teach inventions for automatically controlling water heaters. U.S. Pat. No. 2,266,244 to Osterheld teaches a manually adjustable time delay that is installed on electric water heaters. The Osterheld time delay requires a temperature probe be inserted into the water tank of an electric water heater. The Osterheld invention causes a delay in the energization of the electric heater beyond the start of an off-peak period so that water is not heated when the demand for hot water is low. (Osterheld, Col. 2, Lines 1-8) The Osterheld invention is directed to controlling electrical current to a water heater and not gas. Additionally, Osterheld does not teach a time delay that requires no alterations to the existing water heater.

U.S. Publication No. 2007/0051819 to Isaacson teaches a water heater with programmable low temperature mode. This is an apparatus for gas heated water heaters and requires a temperature probe be installed into the water tank of the water heater to monitor the temperature of the water. The Isaacson water heater has a high temperature mode and a low temperature mode. In low temperature mode, the temperature of the water is kept in a certain range of temperatures. In the high temperature mode, the water is heated above the low temperature mode range of temperatures. Isaacson does not teach an energy saving switch that can be installed with minimal effort on an existing water heater.

U.S. Pat. No. 6,920,843 to Wilson teaches a programmable water heater that can be programmed to provide hot water at different times of day. The Wilson programmable timer is powered by a solenoid rather than by typical wall current. As with Isaacson, Wilson does not teach an energy saving switch that can be installed with minimal effort on an existing water heater.

U.S. Publication No. 2011/0062248 to Subramanian teaches a programmable water heater thermostat controller that attaches over the temperature control unit of an existing gas or electric water heater. The Subramanian thermostat controller can be programmed to turn the water heater on and off at different times of day. It controls the water heater temperature by clamping the water heater thermostat control between two rollers that work together to rotate the thermostat control in one direction or the other. This clamping action is problematic because over time, the rollers may slip on the thermostat control or fail to rotate the thermostat control at all as the thermostat control stiffens with age and wear. The Subramanian thermostat controller is also installed in such a way that the water heater owner cannot manually override the controller in order to manipulate the thermostat control freely.

In light of the prior art, there is a need for a process for heating water to a target temperature during a given time interval. There is also a need for an energy saving switch that that utilizes this process and can be mounted on an existing water heater and securely connected to the thermostat control valve of the water heater in such a way that there will be no rotational slipping. Additionally, a need exists for such a switch that can be manually overridden if needed while remaining mounted on a water heater with no additional modifications to the water heater.

SUMMARY OF THE INVENTION

The present invention includes a process for conserving energy while operating a water heater and an energy saving switch for a water heater that embodies this process.

The process for conserving energy while operating a water heater comprises the steps of: programming a system controller with at least one time interval; assigning a target temperature for the water in the water heater to the time interval; comparing the current time to the time interval to determine if the current time is within the time interval; heating the water in the water heater if the current time is within the time interval and the target temperature has not yet been reached. The process may also include ceasing to heat the water in the water heater if the current time is outside the time interval or if the current temperature of the water in the water heater is greater than or equal to the target temperature. This can be accomplished automatically or via a manual over-ride. The system controller may also be programmed with more than one time interval if hot water is needed during multiple times of the day. Every time interval in the claimed process has a start time and an end time, wherein the step of heating the water in the water heater occurs after the start time and before the end time.

The energy saving switch for a water heater that embodies the claimed process comprises: a programmable system controller; a geared output escapement shaft with a proximal end and a distal end; a sprag wheel attached to the proximal end of the geared output escapement shaft; a motor powered by the programmable system controller and connected to the sprag wheel wherein the motor rotates the sprag wheel which in turn rotates the geared output escapement shaft; an adjustable control lever; a geared input control shaft with a proximal end and a distal end, wherein the adjustable control lever is mounted to the proximal end and the distal end is angularly connected with the distal end of the geared output escapement shaft; and a mating cuff configured about the distal end of the geared output escapement shaft. The programmable system controller may include: a programmable logic circuit configured with a power input connection, a data input connection, and an output connection; means for inputting instructions into the programmable logic circuit via the data input connection; and means for storing the instructions input into the programmable logic circuit. The programmable logic circuit may further include a back-up power source and a remote control. The motor is powered via the output connection of the programmable system controller. The motor is also connected to the proximal end of the geared output escapement shaft by a drive shaft connector.

The sprag wheel, located at the proximal end of the geared output escapement shaft, allows for the motor to continue rotating even if the geared output escapement shaft is locked. The sprag wheel is comprised of an inner disc with a planar first side. The planar first side includes a radial cavity to accept a compression spring and ball. The opposite second side of the inner disc is fitted with a shaft connector that is connected to the motor. The proximal end of the geared output escapement shaft is formed into a cup shape with an inner diameter that includes an axial notch. When the sprag wheel's inner disc rotates in either direction inside the inner diameter of the proximal end of the geared output escapement shaft, the ball ended compression spring will engage the axial notch of the geared output escapement shaft. With the compression spring and ball thus engaged, the geared output escapement shaft will rotate until it reaches a predetermined stop. At that point, the compression spring and ball will extend into the radial cavity and the sprag wheel will continue to be rotated by the motor for the allotted time set by the program.

The energy saving switch may also include a stop block mounted to the energy saving switch adjacent to the adjustable control lever such that the stop block prevents the adjustable control lever from rotating past a predetermined point.

The mating cuff of the energy saving switch may include: a circular outer cuff, mounted to the exterior of the energy saving switch about the distal end of the geared output shaft, having a curved inner surface and fitted with apertures along the circumference; curved inner clamps, having a convex side and threaded apertures wherein the convex side of the curved inner clamps corresponds with the curved inner surface of the circular outer cuff; and clamp screws, wherein the clamp screws are long enough to pass through both the apertures of the circular outer cuff and the threaded apertures of the curved inner clamps. The mating cuff is positioned over the circular collar of the thermostat control valve such that the circular collar is in between the circular outer cuff and the curved inner clamps. When the clamp screws are tightened, the convex side of the curved inner clamps tightens against the circular collar of the thermostat control valve, thereby creating a means by which the energy saving switch can be clamped onto the collar of a thermostat control valve.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
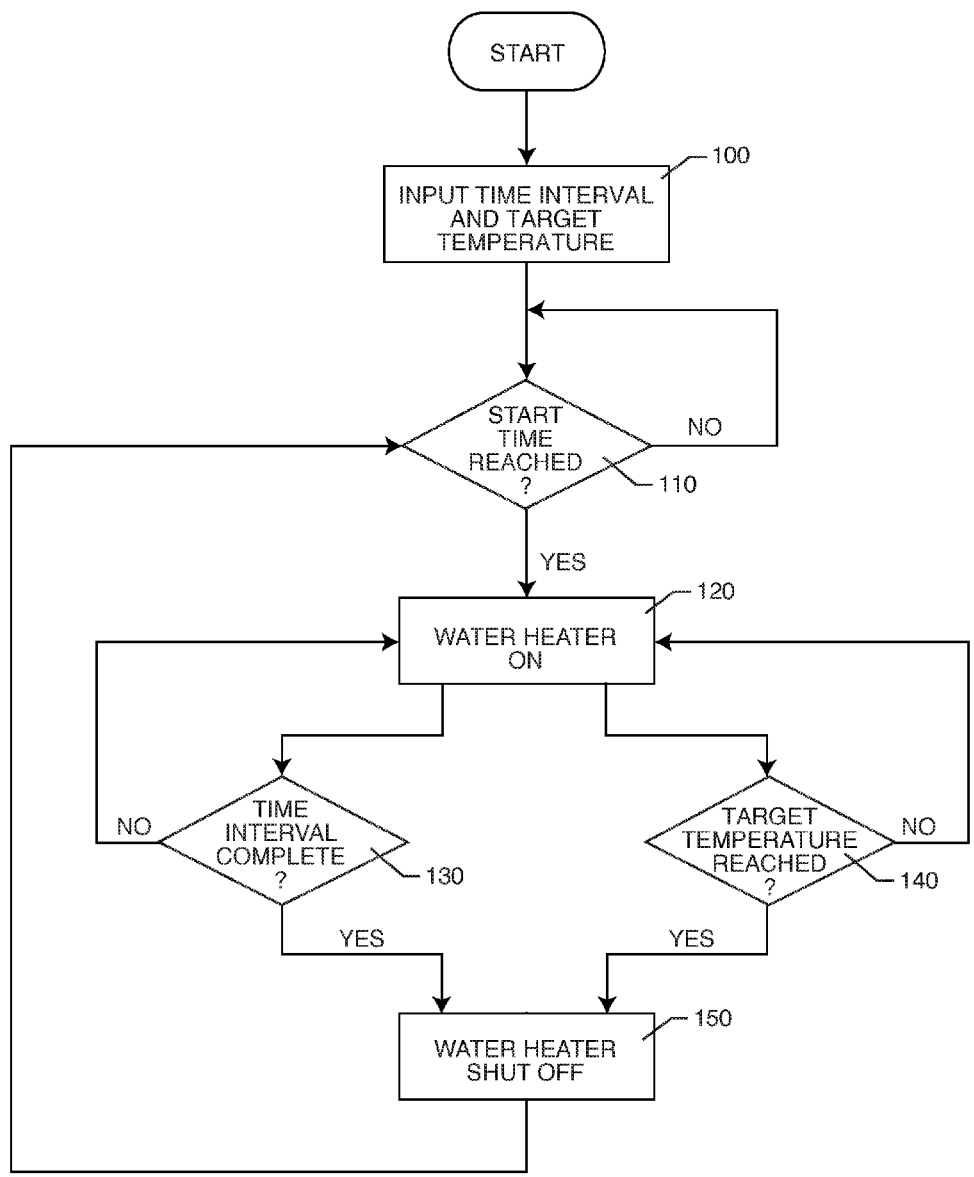
FIG. 1 is a flow chart illustrating the process of the present invention.

The present invention is directed to a process and apparatus for conserving energy while operating a water heater. FIG. 1 is a flow chart illustrating the claimed process.

The claimed process begins in box 100 by inputting a time interval and a target temperature. The time interval has a start time and an end time. The claimed process can have one time interval or many time intervals, either per day or per week. A time interval can be set to occur once a day, or once a week, or once on a given date. In the step represented by box 100, a user can create a schedule of time intervals such that heated water is available at the various times of day that the user needs hot water. Box 100 also includes inputting a maximum target temperature for the time interval. The maximum target temperature is the point which the water is not to be heated beyond during the given time interval. By setting the maximum target temperature, the user ensures that the water will not be over-heated during the heating time interval. For example, if the user's household includes small children, the maximum target temperature can be set a little lower than normal in order to guard against scalding.

Box 110 represents the beginning of a continual cycle. If the current time is before the start time, then the start time has not been reached. This loop continues until the current time is equal to the start time. Once the start time of the time interval has been reached, then the process moves to box 120 where the water heater is turned on. In the preferred embodiment of the present invention, the water heater is turned on by increasing the temperature setting of the water heater thermostat control valve. Until the start time of a time interval is reached, the water heater thermostat control valve is set to its lowest setting. In most water heaters, the lowest setting is "Vacation". With the dial turned to "Vacation", the heating element of the water heater is not shut all the way off. Rather it is turned low, so that the water in the water heater tank is kept at a low temperature (approximately 45 degrees Fahrenheit in many cases, or the ambient temperature if the ambient temperature is higher than 45 degrees). When the water heater is turned on, as in box 120, the flow of gas or electricity to the heating element is turned on and the heating element burns. This means that the temperature of the water inside the water heater tank is increased. The water heater remains on as long as the conditions in boxes 130 and 140 remain false. Once either one of the conditions in boxes 130 and 140 become true, the process moves to box 150 and the water heater shuts off.

In box 130, the current time is compared to the start time and the end time as defined by the current time interval. If the current time is after the start time, but before the end time, then the time interval is not complete and this condition is false. In box 140, the current temperature setting of the water heater is compared to the maximum target temperature set for the current time interval. If the current temperature setting is less than the maximum target temperature then the maximum target temperature has not been reached and this condition is false. The water heater remains on as long as both conditions in boxes 130 and 140 remain false. The water heater is shut off as in box 150 when either the time interval is complete or the target temperature is reached, or both the time interval is complete and the maximum target temperature is reached.

In a preferred embodiment, water heater shut off, as in box 150, is accomplished by rotating the water heater thermostat control valve back down to its lowest setting. The water heater remains in this state until the start time of the next time interval is reached again in box 110. At that point, the water heater turns on in box 120, and the process begins again.

Figure 2:
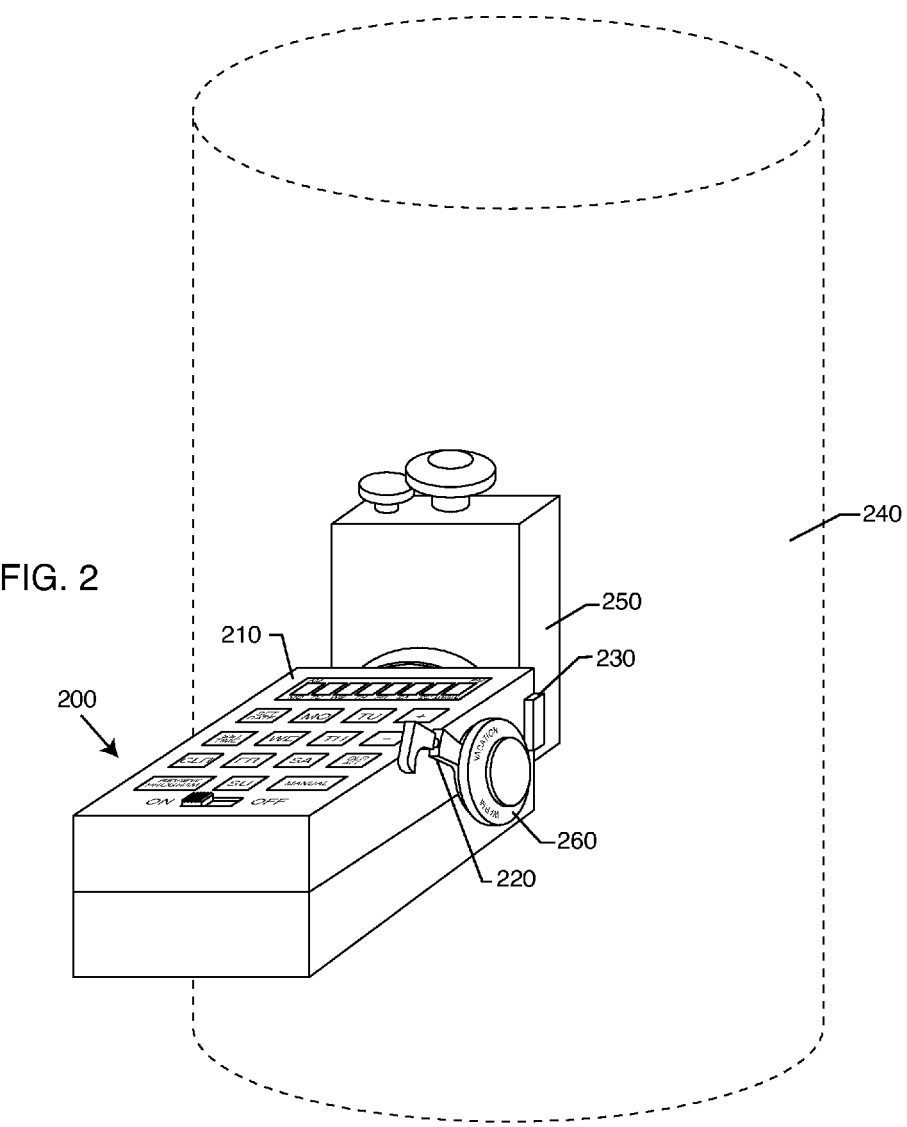
FIG. 2 is a perspective view of the present invention mounted on a water heater.

FIG. 2 illustrates a preferred embodiment of the claimed energy saving switch. The energy saving switch 200 is shown mounted on the thermostat control valve 250 of a water heater 240. The energy saving switch 200 has means for inputting information 210. In the preferred embodiment, the means for inputting information 210 is a keyboard that allows the user to input time intervals and other system settings. The energy saving switch 200 also features a control lever 220 and a stop block 230. The control lever 220 also features a temperature dial 260 that indicates different heat settings. The control lever 220 and the stop block 230 work in conjunction to allow the user to set the maximum target temperature for the desired time interval. The operation of the control lever 200 and the stop block 230 are shown in more detail in FIGS. 4 and 5.

Figure 3:
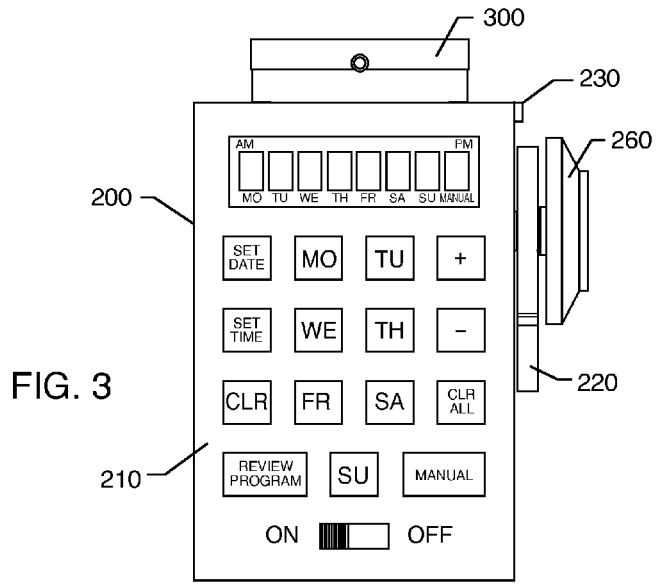
FIG. 3 is a top view of the present invention illustrating the input keyboard for the system controller.

FIG. 3 shows the top face of the energy saving switch 200 featuring means for inputting information 210, the control lever 220, the stop block 230, and the temperature dial 260. The means for inputting information 210 may also be located elsewhere in wireless connection with the energy saving switch 200. In that case, the means for inputting information may be operated by remote control, or via the Internet, or another type of wireless device. In the preferred embodiment, the means for inputting information 210 is a keyboard with a plurality of labeled keys. In the preferred embodiment, there are keys for inputting days of the week, start times, and end times. There is also an on/off switch and a manual override. FIG. 3 also shows the mating cuff 300. The mating cuff 300 is illustrated in more detail in FIGS. 10-14.

Figure 4:
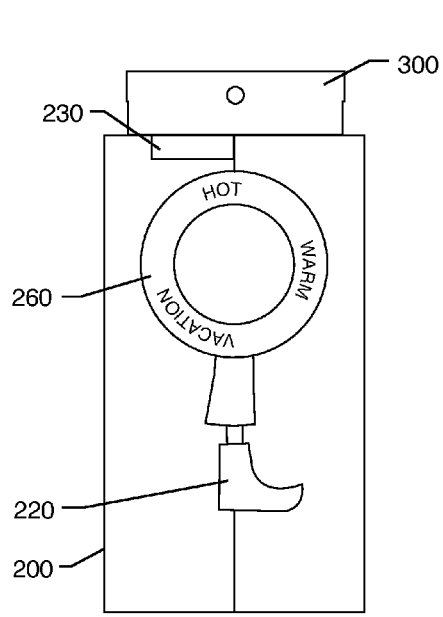
FIG. 4 is a side view of the present invention illustrating the control lever, temperature dial, and stop block of the present invention.

FIG. 4 is a side view of the energy saving switch 200 showing the control lever 220, the stop block 230 and the temperature dial 260. The temperature dial 260 is the same dial the water heater is installed with. When the energy saving switch 200 is mounted on the water heater temperature control valve, the temperature dial 260 is removed from the water heater and attached to the energy saving switch 200. This allows the energy saving switch 200 to be calibrated more precisely to the water heater that it is mounted on.

Figure 5:
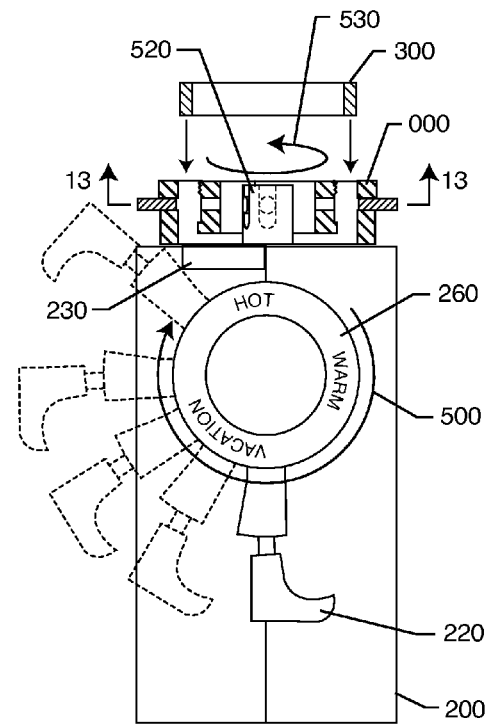
FIG. 5 is a side view of the present invention illustrating the movement of the control lever in relation to the stop block as well as the mating cuff of the present invention.

The movement of the control lever 220 of the energy saving switch 200 is illustrated in FIG. 5. When the user is setting the energy saving switch with a time interval and target temperature, he positions the control lever 220 at the desired target temperature along the temperature dial 260. For example, if the user wants the water temperature in the water heater to be warm in between 4:30 P.M. and 7:30 P.M., he will input those times into the process controller, then he will position the control lever 220 so that it is next to "WARM" as indicated by the temperature dial 260. When 4:30 P.M. occurs, the control lever 220 rotates along directional line 500. As the control lever 220 rotates along directional line 500, the modulating detent 520 simultaneously rotates along directional line 530 thereby rotating the thermostat control valve 250 and increasing the temperature of the water in the water heater 240. The control lever 220 moves along directional line 500 until it contacts the stop block 230. Once the control lever 220 contacts the stop block 230, the control lever 220 can rotate no further in the direction indicated by line 500. The stop block 230 prevents the control lever 220 from over rotating, which thereby prevents the water in the water heater 240 from heating to temperatures above a predetermined point, i.e., a maximum temperature. When the time interval ends, the control lever 220 rotates in the opposite direction until the water in the water heater is no longer being heated.

In an alternate embodiment, a step controller is used rather than a motor 630 with a timed rotation. A step controller can be programmed with rotational distances so that a target temperature during a given time interval can be achieved by the pre-programmed step controller rotating the modulating detent 520 a known number of degrees. In this alternate embodiment, the control lever 220 and stop block 230 become a safety measure to provide a point past which the thermostat control valve 250 cannot be rotated, should the step controller malfunction.

Figure 6:
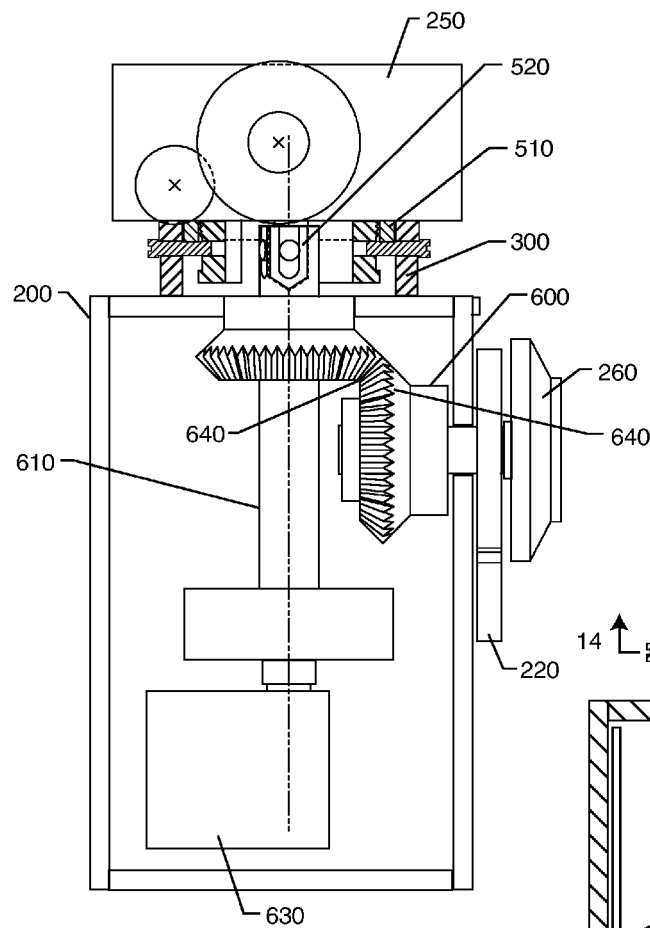
FIG. 6 is a top internal view of the present invention illustrating the geared input shaft, the geared output shaft, the sprag wheel, and the motor.
Figure 7:
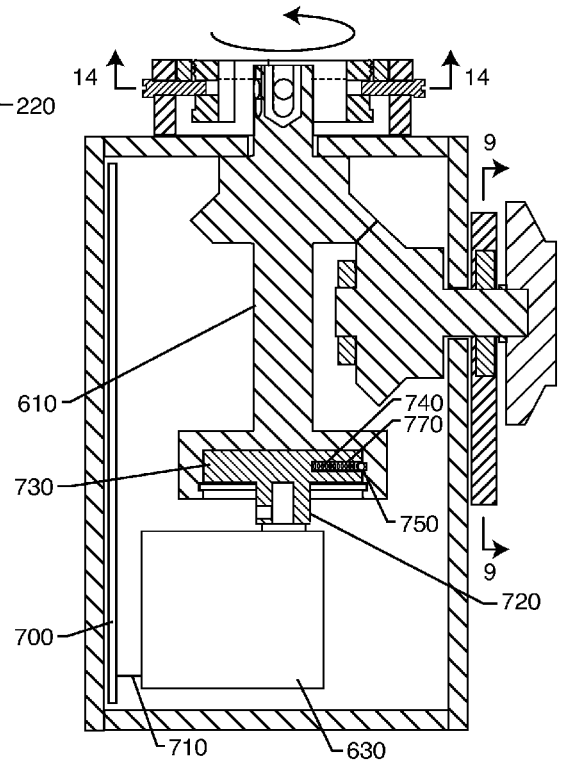
FIG. 7 is a top internal view of the present invention illustrating the compression spring and ball of the sprag wheel.
Figure 8:
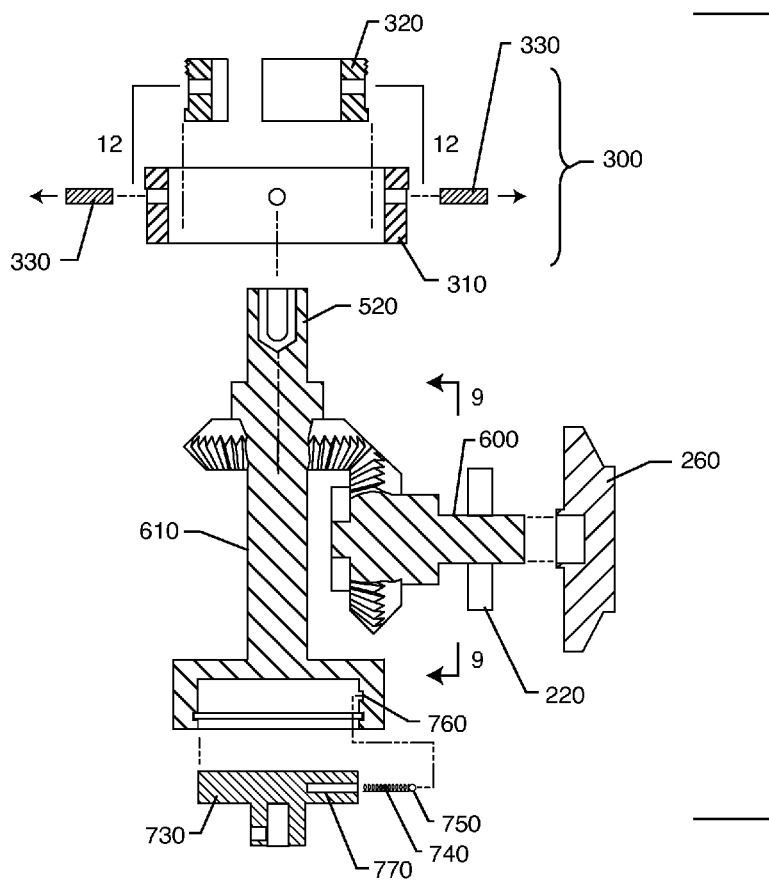
FIG. 8 is an exploded view of the present invention illustrating the placement of the parts of the mating cuff, the parts of the control lever and temperature dial, and the parts of the sprag wheel.

The internal operations of the preferred embodiment are illustrated in FIGS. 6-8. FIG. 6 illustrates how the geared input control shaft 600 and the geared output escapement shaft 610 work together to rotate the modulating detent 520 when it is connected to the thermostat control valve 250 of the water heater 240. The modulating detent 520 forms a positive connection with the thermostat control valve 250 such that the thermostat control valve 250 is locked into the energy saving switch 200. The connection between the modulating detent 520 and the thermostat control valve 250 is not frictional, but rather is made by a positive engagement that ensures that the modulating detent 520 and the thermostat control valve 250 rotate in concert.

Both the geared input control shaft 600 and the geared output escapement shaft 610 have a proximal and a distal end. The proximal end of the geared input control shaft 600 is connected to the control lever 220. The proximal end of the geared output escapement shaft 610 is formed into a cup shape with an inner diameter that includes an axial notch 760. A sprag wheel 730 is fitted within the inner diameter and connects to a motor 630. The geared input control shaft 600 and the geared output escapement shaft 610 are angularly connected at their distal ends via interlocking teeth 640 on their respective, angularly positioned gears. The interlocking teeth 640 allow for the geared input control shaft 600 and the geared output escapement shaft 610 to simultaneously rotate in opposite directions, even though they are mounted at a 90 degree angle to each other.

FIG. 7 shows the preferred placement of the programmable logic controller 700. The programmable logic controller 700 is preferably a computer circuit board with a power input connection, a data input connection, programmable logic, computer memory, and an output connection. The power input connection (not shown) is connected to the programmable logic controller 700. The power input connection (not shown) may be connected to a standard power outlet. The power input connection can also be connected to a back-up power source (not shown). The back-up power source is an on-board battery. This allows the energy saving switch 200 to maintain current time settings in the programmable logic controller during periods of household power outage. The output connection 710 is connected to the motor 630. The programmable logic controller 700 preferably includes computer memory to store instructions and programmable logic to process instructions. Depending on the processed instructions, the output connection 710 selectively powers the motor 630, and changes the rotational direction of the motor 630.

FIG. 7 also illustrates the sprag wheel 730 of the preferred embodiment. The sprag wheel 730 has a proximal and a distal end. The distal end of the sprag wheel 730 is a disc featuring a radial cavity 770 on the circumference of the disc which accepts a compression spring 740 and a ball 750. The proximal end of the sprag wheel 730 has a recess to accept and attach to the motor 630. The proximal end of the geared output escapement shaft 610 has a cup shaped recess featuring an axial notch 760 on the inner circumference of the geared output escapement shaft 610. The axial notch 760 in the geared escapement shaft 610 will accept the ball 750, which is retained therein by the compression spring 740.

In operation, the sprag wheel 730 allows the motor 630 to continue rotating once the control lever 220 is blocked by the stop block 230. For example, when a user sets the desired maximum target temperature for a given time interval, he rotates the control lever 220 to the desired maximum target temperature on the temperature dial 260. When the time interval begins, the motor 630 starts to rotate the control lever 220 toward the stop block 230. When the maximum target temperature is reached, the control lever 220 is in contact with the stop block 230, and can no longer rotate. Once the control lever 220 is blocked by the stop block 230, the geared input control shaft 600 can no longer rotate. The inter locking teeth 640 of the geared input control shaft 600 and the geared output escapement shaft 610 lock the geared output escapement shaft 610 from rotating further. At this point, the members of the energy saving switch 200 are locked, but the motor 630 does not stop. Rather, the motor 630 continues to rotate because the sprag wheel 730 has disengaged from the axial notch 760 of the geared output escapement shaft 610. The motor 630 will continue to rotate for a programmed period of time.

In an alternate embodiment, a step controller is utilized rather than a motor 630 with a timed rotation. A step controller is programmed with rotational distances so the control lever 220 is no longer needed to set the desired target water temperature for a given time interval. In this alternate embodiment, a time interval begins and the step controller rotates the geared output control shaft 610 a certain number of degrees. When the thermostat control valve 250 has been rotated to the appropriate temperature setting, the step controller stops rotating the geared output control shaft 610. In this embodiment, the sprag wheel 730 is not utilized because the step controller is programmed to stop after a given number of rotations. If the step controller has been mis-programmed, or has malfunctioned, the control lever 220 and stop block 230 serve to prevent the thermostat control valve 250 from being over-rotated, producing water that is too hot for home use. If the step controller over-rotates the geared output control shaft 610 and the geared output control shaft 610 is locked by the control lever 220 and stop block 230, the sprag wheel 730 will keep the step controller from burning out.

In the preferred embodiment with a rotating motor 630, the sprag wheel 730 allows for the motor 630 to rotate for a specified period of time, even though the rest of the energy saving switch 200 is locked. The compression spring 740 and ball 750 located within the radial cavity 770 of the sprag wheel 730, and is tensioned such that it allows the sprag wheel 730 to rotate within the proximal end of the geared output escapement shaft 610, even while the geared output escapement shaft 610 is locked. When the geared output escapement shaft 610 is locked, the compression spring 740 no longer has enough compression to cause the ball 750 to remain in the axial notch 760 of the proximal end of the geared output escapement shaft 610. As the sprag wheel 730 continues to be rotated by the motor 630, the compression spring 740 and ball 750 compress into the radial cavity 770 of the sprag wheel 730. This allows the motor 630 to continue rotating for a specified period of time. This remains true even though the geared input control shaft 600 and the geared output escapement shaft 610 are locked.

When the time interval ends, the programmable logic controller 700 changes the rotational direction of the motor 630. As the sprag wheel 730 makes a rotation in the opposite direction, the compression spring 740 and ball 750 line up with the axial notch 760 in the proximal end of the geared output escapement shaft 610. At this point, the compression spring 740 expands, pushing the ball 750 into the axial notch 760 of the geared output escapement shaft 610. With the compression spring 740 thus expanded and pressing the ball 750 into the axial notch 760, the geared output escapement shaft 610, geared input control shaft 600, and control lever 220 can freely rotate in the opposite direction. These members continue to operate in this direction until the thermostat valve 250 can no longer be rotated. At this point, the geared output escapement shaft 610 will stop and the sprag wheel 730 allows the motor 630 to continue operating in the opposite direction for a specified period of time. Once the time period ends, the motor 630 will stop.

In an alternate embodiment of the present invention, a step controller is used to power the rotation of the geared input control shaft 600 and the geared output escapement shaft 610.

Having a step controller rather than a continuous motor would negate the need for a sprag wheel 730, as in the preferred embodiment.

FIG. 8 is an exploded view of the energy saving switch 200 of the present invention. The sprag wheel 730, as described above, is formed on the proximal end of the geared output escapement shaft 610. The distal end of the geared output escapement shaft 610 is angularly connected with the distal end of the input control shaft 600. The distal end of the geared output escapement shaft 610 also comprises the modulating detent 520. The modulating detent 520 is formed to connect with the thermostat control valve 250 such that when the modulating detent 520 is rotated, the thermostat control valve 250 is rotated also. The proximal end of the input control shaft 600 comprises the control lever 220 and is fitted with the temperature dial 260.

FIG. 8 also includes an exploded view of the mating cuff 300. The mating cuff 300 serves to attach the energy saving switch 200 to the water heater 240, and to support the energy saving switch 200 in a position perpendicular to the water heater 240. The mating cuff 300 is formed to the exterior of the energy saving switch 200, and is circularly placed about the modulating detent 520. The mating cuff 300 comprises a circular outer cuff 310, curved inner clamps 320, and a plurality of clamp screws 330. The operation of the mating cuff 300 is illustrated more particularly in FIGS. 10-14.

Figure 9:
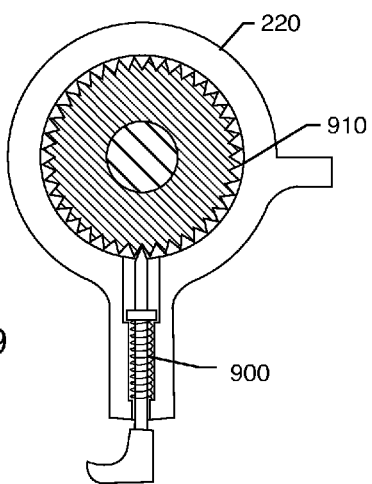
FIG. 9 is a side internal view of the control lever.

FIG. 9 is a side cut-away view of the control lever 220. This view illustrates the spring-loaded retractable member 900 and the geared inner wheel 910. In operation, when the user sets the target temperature for a given time interval, he retracts the spring-loaded retractable member 900 and positions the control lever at the desired temperature indicated on the temperature dial 260. He then releases the spring-loaded retractable member 900. When released, the spring-loaded retractable member 900 engages with the geared inner wheel 910 such that the geared input control shaft 600, the control lever 200, and the temperature dial 260 all rotate together. If the spring-loaded retractable member 900 is not engaged with the geared inner wheel 910, only the geared input control shaft 600 and the temperature dial 260 will rotate together while the control lever 220 remains free. The control lever 220 and the sprag wheel 730 allow the user to manually override the programming of the energy saving switch 200 if necessary. When the user wishes to manually adjust the water heater thermostat control valve 250 off schedule, he simply rotates the control lever 220 toward the stop block 230. The control lever 220 will stay at the position the user has put it in until the next time interval begins and ends.

Figure 10:
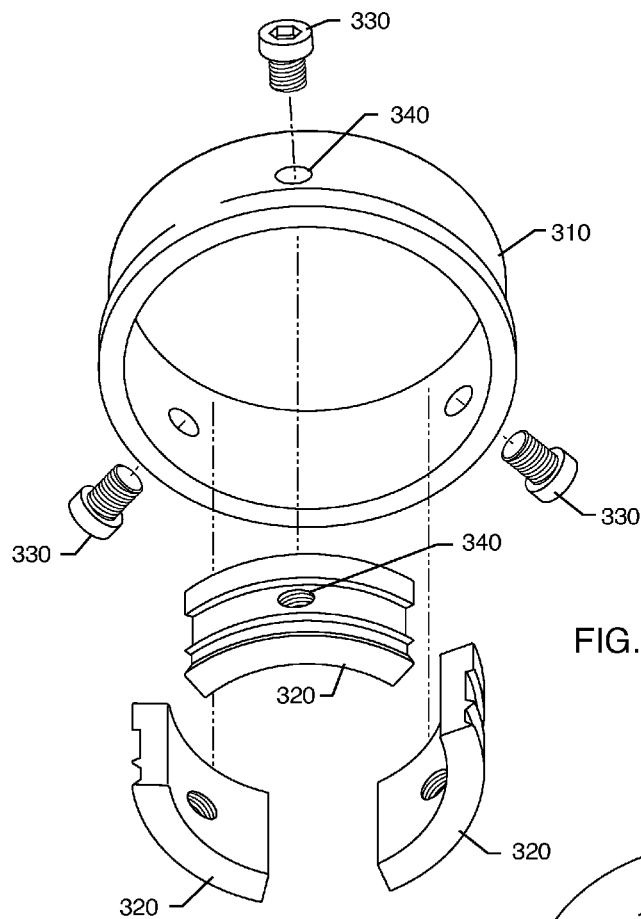
FIG. 10 is an exploded view of the mating cuff of the present invention.
Figure 11:
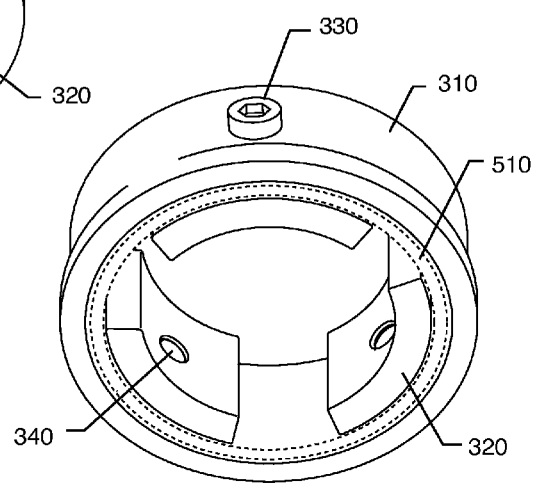
FIG. 11 is a perspective view of the mating cuff of the present invention.

FIGS. 10-14 illustrate the operation of the mating cuff 300. FIG. 10 is an exploded view of the mating cuff 300. The circular outer cuff 310 is fitted with a plurality of apertures 340. The curved inner clamps 320 are also fitted with matching apertures 340. In use, the clamp screws 330 fit through the apertures 340 on both the circular outer cuff 310 and the curved inner clamps 320 and serve to tighten and hold the curved inner clamps 320 in place. FIG. 11 shows how the circular outer cuff 310 fits around the thermostat control valve collar 510. In FIG. 11, the curved inner clamps 320 are tightened against the inner face of the thermostat control valve collar 510 and held in place by the clamp screws 330.

Figure 12:
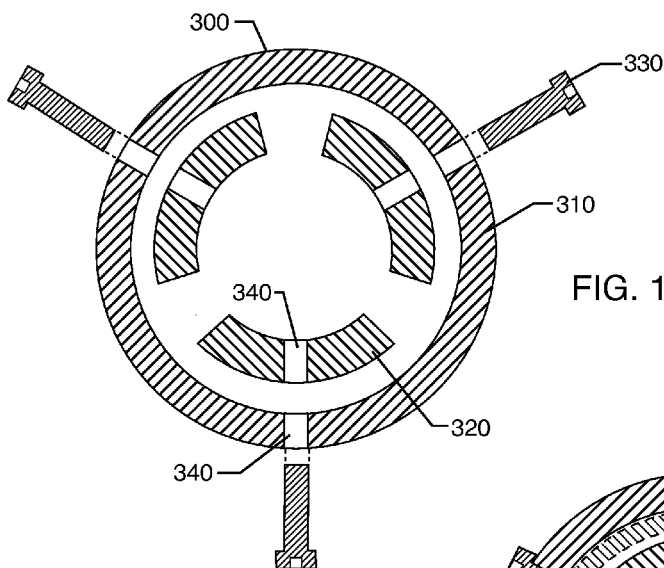
FIG. 12 is a head-on view of the mating cuff of the present invention before it is tightened onto the collar of a water heater temperature control dial.
Figure 13:
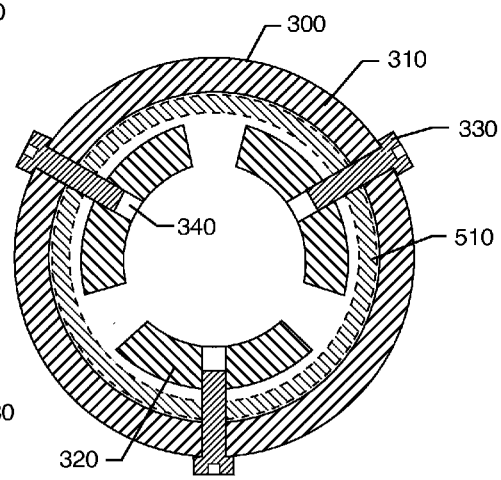
FIG. 13 is a head-on view of the mating cuff of the present invention as it is partially tightened onto the collar of a water heater temperature control valve.
Figure 14:
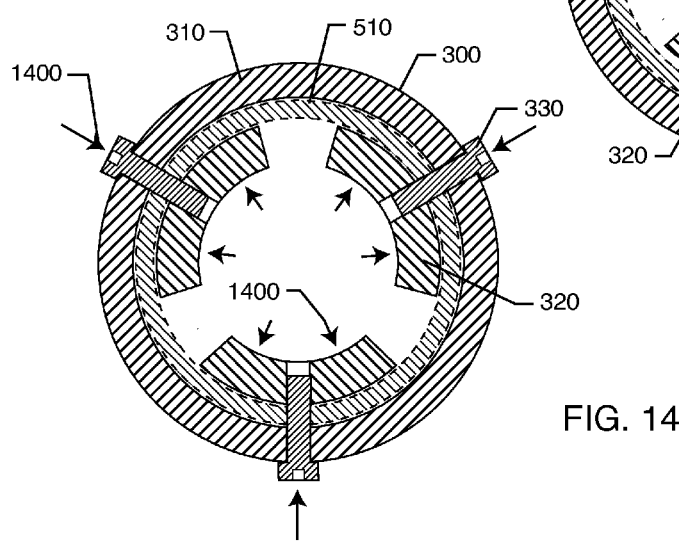
FIG. 14 is a head-on view of the mating cuff of the present invention when it is fully engaged with the collar of a water heater temperature control valve.

The tightening of the curved inner clamps 320 against the inner surface of the thermostat control valve collar 510 is shown in FIGS. 12-14. In FIG. 12, the mating cuff 300 is shown disassembled. In FIG. 13, the clamp screws 330 have been inserted through the apertures 340 of the circular outer cuff 310, and the curved inner clamps 320. As the clamp screws 330 are tightened, the curved inner clamps 320 are tightened against the inner surface of the thermostat control valve collar 510 forming a close fit as shown in FIG. 14. With the clamp screws 330 tightened, the mating cuff 300, and the energy saving switch 200 are held in place against the water heater 240.

Figure 15:
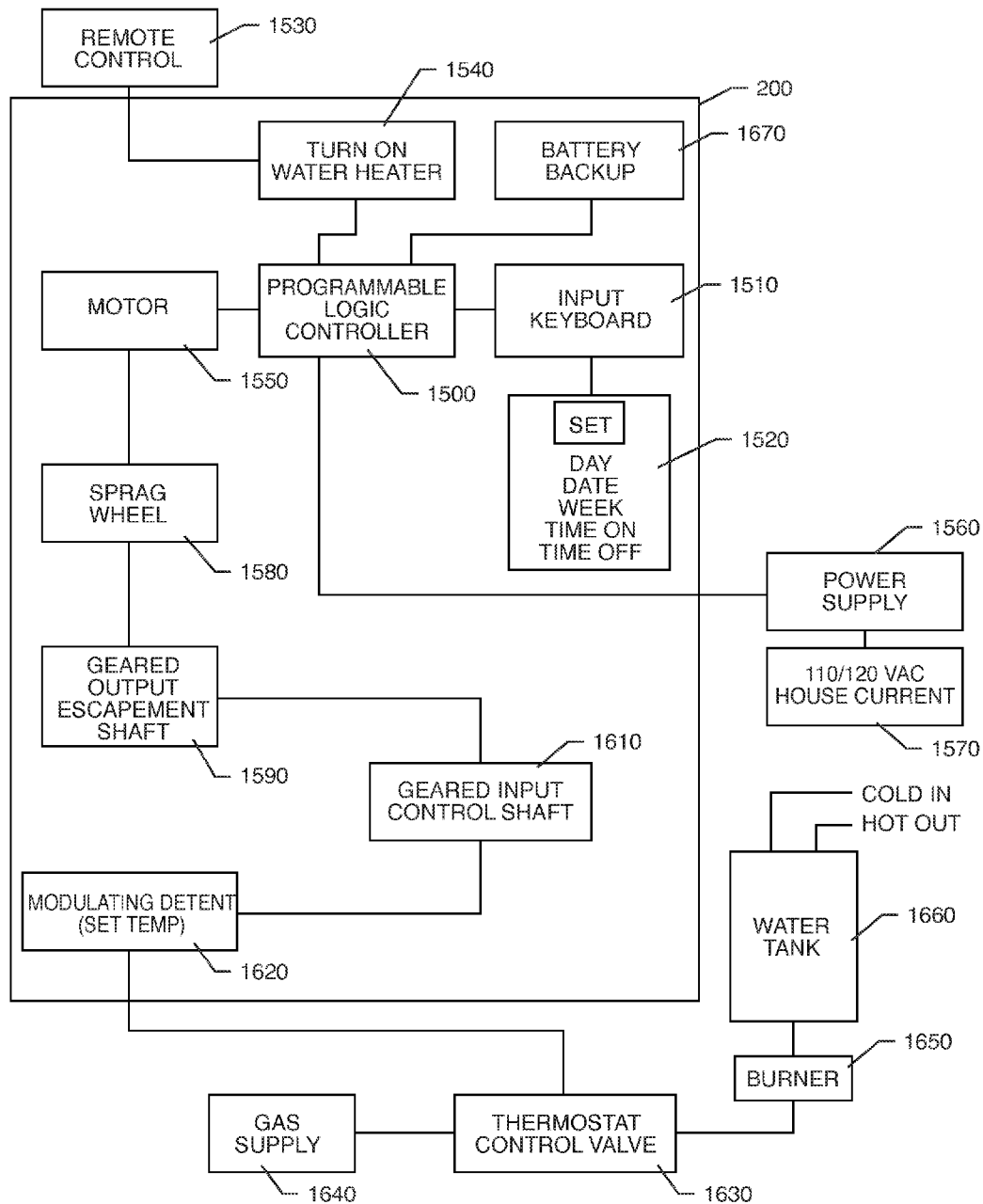
FIG. 15 is a system schematic illustrating the connections between the different parts of the present invention.

FIG. 15 is a system schematic illustrating connections between the members of the energy saving switch 200. The programmable logic controller 1500 is powered by external DC power supply 1560, 110/120 VAC house current 1570, with an on-board battery backup 1670. The on-board battery backup 1670 is present to maintain current time and system settings in the programmable logic controller 1500 during periods of household power outage. The programmable logic controller 1500 is connected to an input keyboard 1510 that is used to schedule time intervals for water heating according to days of the week, date, week, time on, and time off as in 1520. The programmable logic controller 1500 can also be initiated remotely via the remote control 1530. The remote control 1530 can be used to turn on the water heater for a programmed period of time, as in 1540 by overriding the scheduling that the programmable logic controller 1500 has been programmed with. The remote control 1530 can also be used to return the energy saving switch 200 to its normal cycle.

Once the programmable logic controller 1500 initiates a water heating cycle (due to a programmed time interval being reached, or due to a manual override via the remote control 1530 or the input keyboard 1510) the programmable logic controller 1500 powers the motor 1550. The motor is connected to the sprag wheel 1580. The sprag wheel 1580 is connected to the geared output escapement shaft 1590. The sprag wheel 1580 allows the motor 1550 to rotate the geared output escapement shaft 1590 and the geared input control shaft 1610 as long as the geared input control shaft 1610 is not locked. If the geared input control shaft 1610 is locked, the sprag wheel 1580 allows the motor to continue rotating for a programmed period of time while the geared input control shaft 1610 and geared output escapement shaft 1590 remain locked.

The geared input control shaft 1610 is angularly connected to the geared output escapement shaft 1590. The geared output escapement shaft 1590 comprises a modulating detent 1620 at its distal end. The modulating detent 1620 is formed to securely connect with the thermostat control valve 1630 of the water heater. Thus when the modulating detent 1620 is rotated, the thermostat control valve 1630 is rotated as well. The thermostat control valve 1630 controls the gas supply 1640 to feed the burner 1650 of the water heater.

Although several embodiments have been described in some detail for purposes of illustration, various modifications may be made without departing from the scope and spirit of the invention. Accordingly, the invention is not to be limited, except by the appended claims.

What is claimed is:

1. An energy saving switch for a water heater, comprising:
   a programmable logic controller;
   a geared output escapement shaft with a proximal end and a distal end;
   a motor powered by the programmable logic controller and connected to the proximal end of the geared output escapement shaft wherein the motor rotates the geared output escapement shaft;
   an adjustable control lever;
   a geared input control shaft with a proximal end and a distal end, wherein the adjustable control lever is mounted to the proximal end and the distal end is angularly connected with the distal end of the geared output escapement shaft; and a mating cuff configured about the distal end of the geared output escapement shaft.

2. The energy saving switch of claim 1, wherein the programmable logic controller comprises:
- a programmable logic circuit configured with a power input connection, a data input connection, and an output connection;
- means for inputting instructions into the programmable logic circuit via the data input connection; and
- means for storing the instructions input into the programmable logic circuit.

3. The energy saving switch of claim 2, wherein the programmable logic controller further comprises:
- an independent power back-up configured to connect to the power input connection; and
- means for remotely inputting instructions into the programmable logic circuit via the data input connection.

4. The energy saving switch of claim 3, wherein the independent power back-up is an on-board battery.

5. The energy saving switch of claim 2, wherein the means for inputting instructions is a keyboard.

6. The energy saving switch of claim 2, wherein the means for storing instructions is computer memory.

7. The energy saving switch of claim 2, wherein the motor is powered via the output connection of the programmable logic controller, and wherein the motor is connected to the proximal end of the geared output escapement shaft by a drive shaft connector.

8. The energy saving switch of claim 7, wherein the motor and the geared output escapement shaft are both configured for bi-directional rotation.

9. The energy saving switch of claim 1, further comprising a sprag wheel.

10. The energy saving switch of claim 9, wherein the sprag wheel is substantially coextensive with the proximal end of the geared output escapement shaft and the motor, and the proximal end of the geared output escapement shaft comprises a cup-shaped recess with an inner diameter having an axial notch.

11. The energy saving switch of claim 10, wherein the sprag wheel comprises:
- an inner disc, having a planar first side and an opposite second side, a radial cavity disposed on the first side and a drive shaft connector mounted on the second side, wherein the shaft connector is connected to the motor; and
- a compression spring and ball partially disposed within the radial cavity such that the compression spring and ball expand into the axial notch of the inner diameter of the proximal end of the geared output escapement shaft when the sprag wheel is rotated within the inner diameter.

12. The energy saving switch of claim 11, wherein the ball-ended compression spring is tensioned within the radial cavity and axial notch such that the inner disc of the sprag wheel and the geared output escapement shaft rotate in concert.

13. The energy saving switch of claim 12, wherein the compression spring and ball compress completely into the radial cavity of the sprag wheel when the geared output escapement shaft locks such that the compression spring and ball no longer extend into the axial notch of the inner diameter of the proximal end of the geared output escapement shaft and the sprag wheel remains rotatable.

14. The energy saving switch of claim 1, wherein the control lever is affixed with a temperature dial.

15. The energy saving switch of claim 1, wherein the angular connection between the geared input control shaft and the geared output escapement shaft is configured by interlocking the respective gears at a ninety degree angle.

16. The energy saving switch of claim 1, further comprising a stop block mounted to the energy saving switch adjacent to the adjustable control lever such that the stop block prevents the adjustable control lever from rotating past a predetermined point.

17. The energy saving switch of claim 1, wherein the mating cuff is comprised of:
- a circular outer cuff, mounted to the exterior of the energy saving switch about the distal end of the geared output shaft, having a curved inner surface and fitted with threaded apertures along the circumference;
- curved inner clamps, having a convex side and threaded apertures wherein the convex side of the curved inner clamps corresponds with the curved inner surface of the circular outer cuff; and
- clamp screws, wherein the clamp screws are long enough to pass through the apertures of the circular outer cuff and be threaded into the apertures of the curved inner clamps.

18. The energy saving switch of claim 17, wherein tightening the clamp screws of the mating cuff causes the convex side of the curved inner clamps to tighten against the curved inner surface of the circular outer cuff thereby creating a means by which the energy saving switch can be clamped onto the collar of a thermostat control valve.

* * * * *